US010334105B1

(12) United States Patent
Czachor, Jr. et al.

(10) Patent No.: US 10,334,105 B1
(45) Date of Patent: **\*Jun. 25, 2019**

(54) SYSTEM AND METHOD FOR RESPONDING TO DIRE COMMUNICATION AT AN ANSWERING SERVICE

(71) Applicant: ASD Inc., Media, PA (US)

(72) Inventors: Martin Czachor, Jr., Newtown Square, PA (US); Kevin Czachor, West Chester, PA (US); Norman Franke, Garnet Valley, PA (US)

(73) Assignee: ASD Inc., a PA Corp., Media, PA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 15/964,159

(22) Filed: Apr. 27, 2018

(51) Int. Cl.
| | |
|---|---|
| *H04M 3/51* | (2006.01) |
| *H04M 3/56* | (2006.01) |
| *H04M 7/00* | (2006.01) |
| *H04M 3/46* | (2006.01) |
| *H04M 3/42* | (2006.01) |

(52) U.S. Cl.
CPC ..... *H04M 3/5116* (2013.01); *H04M 3/42042* (2013.01); *H04M 3/465* (2013.01); *H04M 3/5108* (2013.01); *H04M 3/5175* (2013.01); *H04M 3/5183* (2013.01); *H04M 3/563* (2013.01); *H04M 7/003* (2013.01); *H04M 2201/42* (2013.01); *H04M 2203/306* (2013.01); *H04M 2203/5018* (2013.01); *H04M 2242/04* (2013.01)

(58) Field of Classification Search
CPC ..... H04M 3/5175; H04M 3/5233; H04M 3/58
USPC ............ 379/45, 212.01, 265.01–265.14
See application file for complete search history.

(56) References Cited

U.S. PATENT DOCUMENTS

| | | | |
|---|---|---|---|
| 3,786,198 A \* | 1/1974 | McNulty ............... | H04M 3/546 379/213.01 |
| 4,629,831 A | 12/1986 | Curtin et al. | |
| 5,546,442 A | 8/1996 | Foladare et al. | |
| 5,943,397 A | 8/1999 | Gabin et al. | |
| 5,960,064 A | 9/1999 | Foladare et al. | |
| 6,798,868 B1 | 9/2004 | Montgomery et al. | |
| 7,573,982 B2 | 8/2009 | Breen et al. | |
| 8,295,448 B2 | 10/2012 | Hyerle et al. | |
| 8,467,515 B2 | 6/2013 | Czachor, Jr. et al. | |
| 8,498,399 B2 | 7/2013 | Czachor et al. | |
| 2004/0018833 A1 | 1/2004 | Praestgaard | |
| 2007/0286389 A1 | 12/2007 | Hyerle et al. | |
| 2016/0125155 A1\* | 5/2016 | Shelter ............... | H04N 7/155 705/2 |

\* cited by examiner

*Primary Examiner* — Melur Ramakrishnaiah
(74) *Attorney, Agent, or Firm* — Steven Meyer

(57) ABSTRACT

A first call from a caller to a called party is forwarded to an agent at an answering service. A notification is received from the agent that a level of seriousness of the first call has become dire, and a second call is established between the agent and a crisis service having a crisis counselor that can provide assistance to the caller. The agent is connected into the second call only when the crisis counselor has acknowledged being available, and the second call is joined with the first call. The crisis counselor and the caller are allowed to speak directly by way of the joined calls, so that the crisis counselor can address the caller and attempt to convince same to avoid any activity that would be harmful thereto.

19 Claims, 4 Drawing Sheets

SYSTEM AND METHOD FOR RESPONDING TO DIRE COMMUNICATION AT AN ANSWERING SERVICE

CROSS-REFERENCE TO RELATED APPLICATION

The present application discloses subject matter related to that disclosed in U.S. patent application Ser. No. 12/851,785, filed on Aug. 6, 2010, and entitled "System and Method for Providing Enhanced Answering Services in a Time-Sensitive Manner", hereby incorporated by reference in its entirety, now issued as U.S. Pat. No. 8,467,515, and also to that disclosed in U.S. patent application Ser. No. 12/987,374, filed on Jan. 10, 2011, and entitled "System and Method for Providing Enhanced Answering Services in a Time-Sensitive Manner", hereby incorporated by reference in its entirety, now issued as U.S. Pat. No. 8,498,399, among others.

FIELD

The present disclosure relates to a business organization or the like that provides answering services, such as answering services for professionals such as doctors, lawyers, funeral directors, servicing representatives, and the like. More particularly, the present disclosure relates to such a business organization that provides such answering services in an especially sensitive context, where matters of especially serious concern may be expected to be encountered on a regular basis. Specifically, the present disclosure relates to the business organization dealing with a dire communication from a caller beyond the normal scope of the aforementioned especially sensitive context, whereby the caller requires immediate attention even greater than that which the organization normally provides.

BACKGROUND

In many business- or professional-related situations or the like, an age-old and recurring problem is effectuating contact between a professional or the like and a client or the like calling or otherwise attempting to contact the professional. Perhaps ideally, the client would place a telephone call or the like to the professional, the professional would answer the placed telephone call instantaneously if not within a matter of moments, the desired contact would thus be established, and the caller and professional could communicate regarding some matter of interest. Notably, however, most professionals are not always available to answer all calls instantaneously or even momentarily. For example, the professional simply may not want to answer calls, such as for example if on a vacation or at a family event, among other things, or the professional may be otherwise occupied by professional matters.

With regard to the latter case in particular, it may be that a doctor may be occupied by a medical matter and unavailable, or a lawyer may be in a legal conference from which she or he is not to be disturbed. Likewise, a funeral director may be attending to a first client while a second client is calling. In such a particular situation as well as others, it should be noted that not only is the funeral director otherwise occupied by the first client, but the nature of the funeral business is such that it would be considered to be particularly insensitive if not rude to answer the call from the second client while still attending to the first client.

Generally, it is to be recognized that a professional or the like may not always be immediately available to answer a call from a client, be it to a landline telephone line or a mobile telephone line or to such other communications device which may be available. As should be appreciated, such a situation can exist even when the client is calling regarding an urgent matter, such as a life-threatening matter or a matter that otherwise should be given immediate attention. Accordingly, it is known that such a professional may employ a business organization that provides answering services or the like (hereinafter, 'an answering service') to answer calls from clients when the professional is not immediately available.

As should be understood, a call to the professional is forwarded therefrom to the answering service by appropriate means when the professional is not available to answer such call or the like, and the answering service may perform a range of answering duties on behalf of the professional. For example, upon answering the call on behalf of the professional, the answering service may let the caller know when the professional is scheduled to be available, or may collect information so that the professional can return the call at an opportune time. Likewise, the answering service may perform an assessment regarding the nature of the call and based thereon may perform a range of actions. Thus, the answering service may determine that a relatively more serious matter requires more immediate action from the professional, in which case the answering service may attempt to contact the professional as soon as possible by appropriate means. Correspondingly, the answering service may determine that a relatively less serious matter requires less immediate action from the professional, in which case the answering service may only create a message for the professional to be collected thereby at a later time.

Particularly with regard to funeral directors and the special needs thereof, funeral answering services and the like have been developed to focus on and address same. Moreover, it should be understood that such funeral answering services are employed not only by funeral directors, but also by other funeral professionals that require similar heightened levels of dignity, caring, and compassion in their answering service needs. Such other funeral professionals may for example include funeral homes, cremation services, crematory facilities, cemetery and memorial parks, casket and coffin companies, livery services, trade embalmers, funeral transport services, coroners, monument companies, burial vault companies, grief and bereavement counselors, body and tissue donation services, pet cremation, burial and cemetery services, and the like.

Typically, upon a funeral business engaging an answering service to answer calls to the funeral business, the answering service engages the services of one or more telephone service providers or the like to effectuate forwarding of telephone calls or the like from the business to the answering service, particularly in a manner deemed necessary and/or advisable by the business. Such engaging and such forwarding services are generally known and need not be set forth herein in any detail other than that which is provided. Generally, the forwarding may occur on any appropriate basis, including the time of day, whether forwarding has been positively engaged or disengaged, whether the business has selected a particular call for forwarding, whether a call has rung a predetermined number of times, whether a phone or phone system of the business is off, or the like.

Notably, the answering service may answer a call on behalf of a particular funeral business according to a pre-determined procedure or 'script' that has been established for the particular funeral business. As may be appreciated, the script can be quite involved, and can tend to cover a wide range of subjects, including the name and location of the deceased, the name, location, and telephone number of the caller, whether the caller is a family member or friend or a staff member at a nursing home or hospital or the like, where and when the funeral is to be performed, where and when burial or cremation is to be performed, required clergy, directions to establishments, parking availability and needs, handicap accessibility, available local florists and flower delivery services, and the like. In fact, such scripts can accommodate a wide range of scenarios and needs, and therefore can be quite extensive. Importantly, with the use of such a script, information can be collected from the funeral caller according to the script and entered into an appropriate database or the like for later retrieval and use, as is generally known.

It is to be understood that in at least some professional situations, an answering service acts not only to answer calls on behalf of a professional, but also acts as what likely is the first contact a caller encounters regarding a called professional. Thus, the answering service may in fact be the initial contact point for the caller with respect to the professional, and in accordance with the especially sensitive context that may be associated with the called professional, may perform a screening function to determine a level of seriousness associated with the caller, at least on an informal basis. Accordingly, if the professional is the aforementioned funeral director and the caller is requesting directions to a funeral, the level of seriousness determined therefor may be relatively low. Likewise, if such caller is newly bereaved and requesting funeral arrangements, the level of seriousness determined therefor may be relatively high.

In at least some instances, however, the level of seriousness may be so high as to be beyond that which is normal for the answering service, in which case the answering service likely cannot be of substantive help to the caller, but instead hopefully can refer the caller elsewhere immediately. Such a dire level of seriousness of the communication from the caller can be expected to vary according to the type of professional called thereby. For example, it may be that the professional is a doctor and the caller is calling for an unconscious patient, in which case an appropriate response for the answering service would be to immediately arrange for an ambulance to collect the patient. Likewise, it may be that the professional is the aforementioned funeral director and the caller is calling to arrange his or her own funeral upon the caller imminently committing suicide, in which case an appropriate response for the answering service would be to immediately place the caller in contact with a suicide prevention service.

The aforementioned funeral business or the like is especially relevant to the present scenario, in that in what may be considered the normal course of operation, an answering service answering a call on behalf of a funeral director takes special care to treat the funeral caller with dignity, caring, and compassion, as is fitting and proper. Thus, the level of seriousness associated therewith is already very high, and an agent answering callers is normally exposed to a relatively high level of stress based thereon. When such agent answers an especially dire call from a caller threatening suicide, or the like, the level of seriousness associated therewith may be considered to be extreme, and the corresponding level of stress experienced by the agent can be career-ending or even life-threatening, especially if the agent is not able to help the suicidal caller and such suicidal caller takes a drastic action while in communication with the agent.

Accordingly, a need exists for a system and method for responding to a dire communication at an answering service or the like. In particular, a need exists for such a system and method where, when an agent at the answering service answers a call from a caller and determines that the call is of an especially high level of seriousness, the agent can immediately trigger a communications protocol to place the caller in direct communication with an external service that can better assist the caller in view of the especially high level of seriousness. Further, a need exists for such a system and method where, upon establishing such direct communication between the caller and the external service, the agent at the answering service can withdraw from the call and detach from the stress associated therewith.

SUMMARY

A caller places a first call to a called party and the called party is unable or unwilling to answer the first call directly. The first call is forwarded to an answering service and answered by an agent thereof. A notification is received from the agent that a level of seriousness of the caller and conversation between the caller and the agent has become dire, and a second call is established between the agent and a crisis service. The crisis service is presumptively staffed with a crisis counselor able to answer the second call and provide assistance to the caller.

The agent is connected into the second call only when the crisis counselor has acknowledged being available, and the second call between the connected agent and the crisis counselor at the crisis service is joined with the first call between the caller and the connected agent. The crisis counselor at the crisis service and the caller are allowed to speak directly by way of the joined calls, so that the crisis counselor at the crisis service can address the caller and attempt to convince same to avoid any activity that would be harmful thereto.

BRIEF DESCRIPTION OF THE DRAWINGS

The foregoing summary as well as the following detailed description of various embodiments of the present innovation will be better understood when read in conjunction with the appended drawings. For the purpose of illustrating the various embodiments of the innovation, there are shown in the drawings embodiments that are presently preferred. As should be understood, however, the innovation is not limited to the precise arrangements and instrumentalities shown. In the drawings.

DETAILED DESCRIPTION OF PREFERRED EMBODIMENTS

Figure 1:
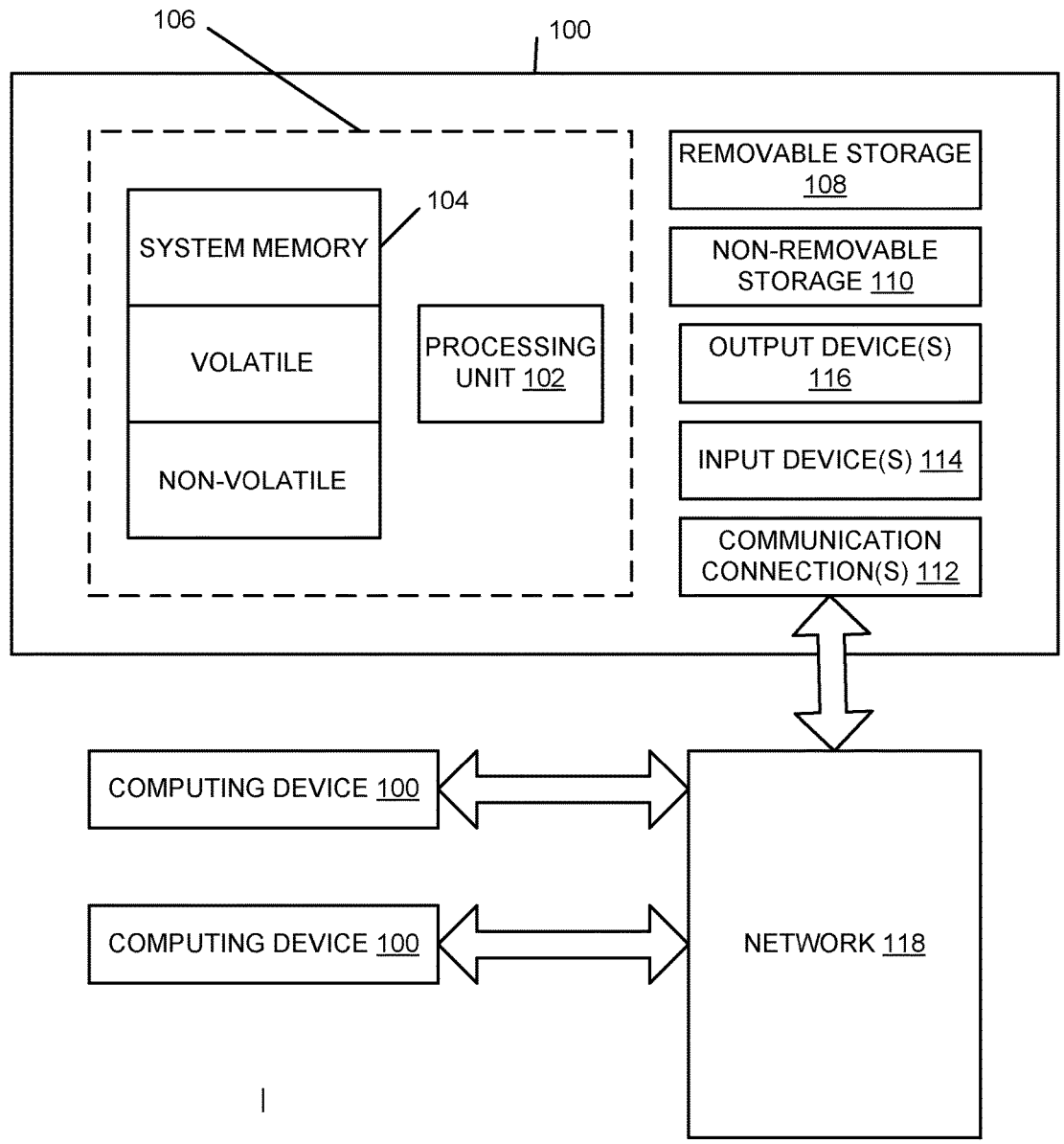
FIG. 1 is a block diagram of an example of a computing environment within which various embodiments of the present innovation may be implemented.

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, the inventors also contemplate aspects of the invention described by the plural of that term. As used in this specification and in the appended claims, the singular forms "a", "an" and "the" include plural references unless the context clearly dictates otherwise, e.g., "a tip" includes a plurality of tips. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Example Computing Environment

FIG. 1 is set forth herein as an exemplary computing environment in which various embodiments of the present invention may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, 'smart' phones, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features and functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable hardware media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other computer-readable hardware medium which can be used to store the desired information and which can accessed by computing device 100. Any such computer storage media may be part of computing device 100.

Computing device 100 may also contain communications connection(s) 112 that allow the device to communicate with other devices 100. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection (including VoIP), and wireless media such as acoustic, radio frequency (RF), Wi-Fi, infrared and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like. Likewise, the network 118 may be such an external network.

Particularly in the case where the network 118 is an external network, such network 118 may be a digitally based network (including VoIP) for exchanging computer data among the devices 100, may be an audio and/or video network for exchanging audio and/or video data among the devices 100, or the like. Thus, it may be that the network 118 may be a public switched telephone network for landline telephone communications, a mobile switching center for wireless telephone communications, a paging network for distributing paging information, a private multimedia network for establishing videoconferencing, or the like. Thus, it should be appreciated, that one or more of the computing devices 100 that are shown to the left of the network 118 in FIG. 1 may be a mobile telephone, a landline telephone, a pager, a mobile electronic mail device, a desktop electronic mail device, a mobile electronic texting device, a desktop electronic texting device, or a combination thereof, or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as a magnetic disk, an optical disk, a flash RAM drive, a locally accessible storage medium, a remotely accessible storage medium, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effectuated across a plurality of devices in a network 118. Such devices might include personal computers, network servers, and handheld devices, for example.

Professional Answering Service

Figure 2:
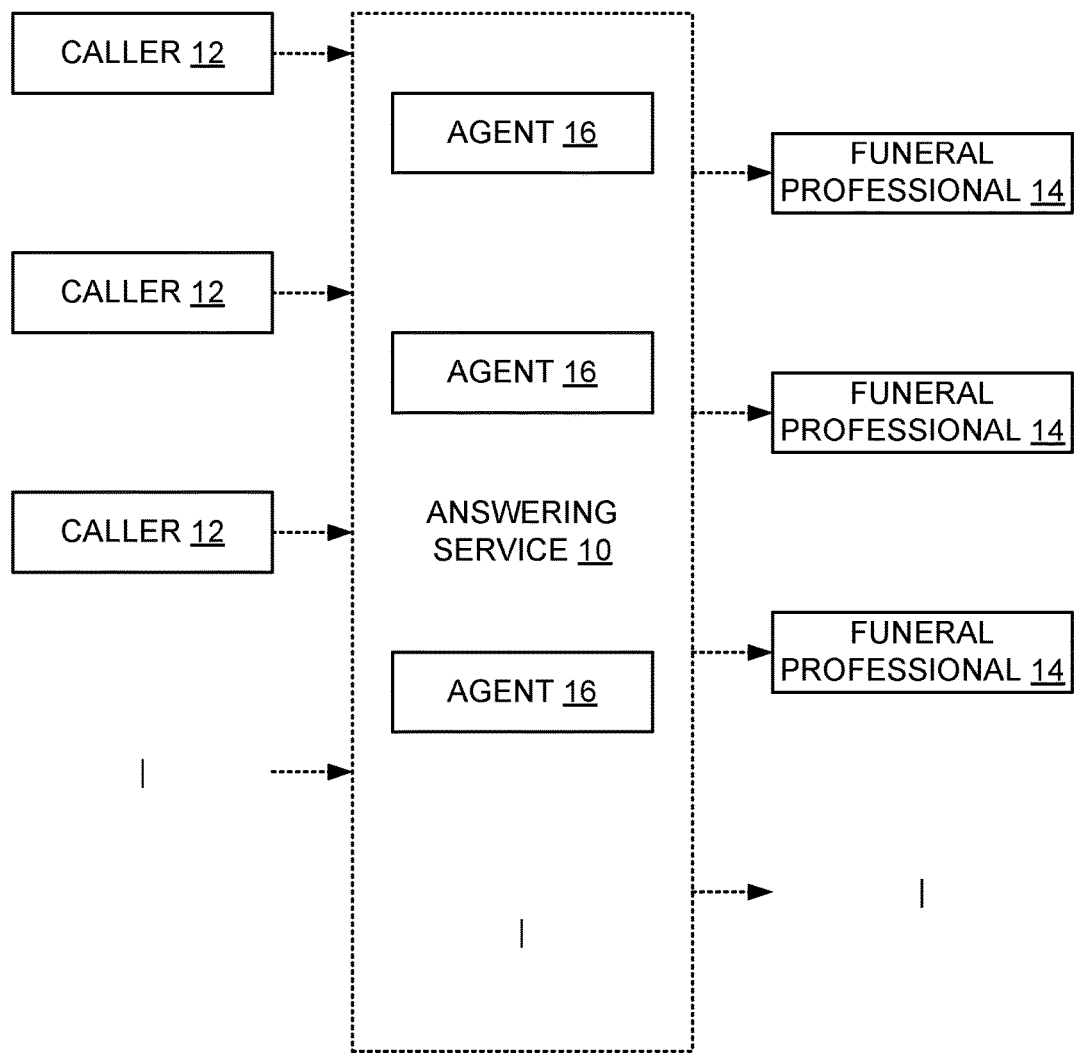
FIG. 2 is a block diagram showing a professional answering service provided to answer calls or the like from clients to professionals or the like in the event that the professionals are not willing or able to answer the calls.

Turning now to FIG. 2, it is seen that a professional answering service 10 is provided to answer each of one or more calls or the like from each of one or more clients or callers 12 or the like to each of one or more professionals 14 or the like in the event that a particular professional 14 is not willing or able to answer a particular call from a particular caller 12. Typically, although not necessarily, the answering service 10 is operated by a business organization that provides answering services or the like on behalf of multiple professionals 14. As was alluded to above, each caller 12 and each professional 14 may be any appropriate respective caller and professional without departing from the spirit and scope of the present innovation. Thus it may be that a particular professional 14 is a doctor, a lawyer, a service professional, a funeral director, or the like, among other things, and a particular caller 12 calling to the professional 14 may require the professional services thereof, perhaps on an urgent basis.

Likewise, the reason why the professional 14 does not answer a particular call may be most any reason without departing from the spirit and scope of the present innovation. For example, the professional 14 simply may not want to answer calls, such as for example if on a vacation or at a family event, among other things, or the professional 14 may be otherwise occupied by professional matters.

Presumptively, the call to the professional 14 from the caller 12 is of a telephonic nature, at least for purposes of disclosing the present innovation in the present disclosure. Thus, it may be that the caller 12 is employing a landline telephone or a mobile telephone (a device 100 of FIG. 1, e.g.), and is calling to a landline telephone or mobile telephone of the professional 14 (also a device 100 of FIG. 1, e.g.). Notably, though, the call to the professional 14 from the caller 12 could be of some other nature without departing from the spirit and scope of the present innovation. For example, it may be that the caller 12 is employing a digital electronic mail device or a digital texting device (again, a device 100 of FIG. 1, e.g.), and is addressing a digital electronic mail device or a digital texting device (once again, a device 100 of FIG. 1, e.g.) of the professional 14.

Particularly in the case where the call is telephonic in nature, and as seen in FIG. 2, the call from the caller 12 to the professional 14 is forwarded therefrom to the answering service 10 by appropriate means that have already been established in a generally known manner. Typically, and as was alluded to above, upon the professional 14 engaging the answering service 10 to answer calls on behalf of such professional 14, the answering service 10 communicates with one or more telephone service providers or the like to effectuate such forwarding. As should be understood, the forwarding may be performed according to any appropriate basis, including the time of day, whether forwarding has been positively engaged or disengaged, whether the business has selected a particular call for forwarding, whether a call has rung a predetermined number of times, whether a phone or phone system of the business is off, or the like. In any case, the call from the caller 12 to the professional 14 is in fact answered by the answering service 10 on behalf of the professional 14.

Funeral Professional

Although the professional 14 of the present innovation may be most any professional, it is to be appreciated that the present innovation has special relevance to funeral professionals 14, including not only funeral directors but also related professionals and services such as funeral homes, cremation services, crematory facilities, cemetery and memorial parks, casket and coffin companies, livery services, trade embalmers, funeral transport services, coroners, monument companies, burial vault companies, grief and bereavement counselors, body and tissue donation services, pet cremation, burial and cemetery services, and the like. Notably, such funeral professionals 14 share a common need for a heightened level of dignity, caring, and compassion in connection with the services provided thereby to a caller 12, as well as the services provided on their behalf to the caller 12 by the answering service 10.

For example, a funeral director attending to a first caller 12 is expected to devote an especially heightened level of care and compassion to such first caller 12, even when a second caller 12 is calling such funeral director. Nevertheless, the second caller 12 also should expect the same heightened level of care and compassion. Thus, the dilemma is whether to interrupt the first caller 12 to answer the second caller 12, or to ignore the second caller 12, either of which may be considered to be particularly insensitive if not rude. Moreover, the dilemma may be compounded in the case where the second caller 12 is an initial caller initially calling regarding obtaining funeral services for a deceased, and ignoring same would result in the second caller 12 obtaining funeral services elsewhere, thus representing a substantial monetary loss to the funeral professional 14.

In such an instance, the answering service 10 in answering the call from the initially calling second caller 12 on behalf of the funeral professional 14 allows same to at least somewhat satisfy the needs of the second caller 12 for the moment. More generally, the answering service 10 can very likely be the first contact any caller 12 encounters regarding the called funeral professional 14, and in so doing is the initial public face of the funeral professional 14 to such caller 12 and acts to form the first impression by the caller 12 of the funeral professional 14. Thus, the funeral professional 14 should expect if not require that the answering service 10 treat each caller 12 with a heightened sense of dignity and decorum.

Answering Service Agents

As might be appreciated, providing the aforementioned dignity and decorum is especially difficult for the answering service 10 if the caller 12 has just suffered a loss of a relative or friend and is therefore in an especially precarious frame of mind. Accordingly, the answering service 10 may be expected to employ especially well-trained agents 16 to answer calls from callers 12 to funeral professionals 14, where the agents 16 are selected based at least in part on being compassionate, caring, soothing, and attentive, among other things.

It is to be understood that in at least some professional situations, the answering service 10 acts not only to answer calls on behalf of the professionals 14, but also acts as what likely is the first contact a caller 12 encounters regarding a called professional 14. Thus, an agent 16 at the answering service 10 may in fact be the initial contact point for the caller with respect to the called professional 14, and in accordance with the especially sensitive context that may be associated with the called professional 14, may perform a screening function to among other things determine a level of seriousness associated with the caller 12, at least on an informal basis. That is to say, the agent 16 at least in his or her own mind should be able to develop a sense of the purpose of the call from the caller 12, and to assign a valuation to the call in terms of an importance, a criticalness, an urgency, a direness, a seriousness, and/or the like.

As was alluded to above, such level of seriousness is likely not specifically quantifiable, especially in terms that are to be specifically communicated to the called professional 14. Instead, such level of seriousness is more likely a private evaluation by the agent 16, perhaps along the lines of whether the call is especially grave or the like and thus will be especially mentally and spiritually taxing. In the context of a funeral director, and as was set forth above, if the caller 12 is requesting contact information for a florist, for example, the level of seriousness determined therefor may be relatively low. Likewise, if such caller 12 is newly bereaved and initially requesting funeral arrangements, the level of seriousness determined therefor may be relatively high, while if such caller 12 is a courier needing to deliver a casket to the funeral director, the level of seriousness determined therefor may be somewhere between relatively high and relatively low.

In the normal course of working for the answering service 10, an agent 16 therefor can be expected to deal on a regular basis with levels of seriousness associated with callers 12 that are relatively high. In so doing, the agent 16 can be expected to act competently and effectively in dealing with such callers 12, and in doing so can develop a psychological shield so as to not become personally affected thereby. That said, there are at least some instances, where the level of seriousness for a caller 12 is so high that the agent 16 cannot be expected as a professional to deal with the situation in a capable manner, and perhaps also cannot be expected to deal with the situation as a personal matter. In such a dire instance, the agent 16 likely cannot be of substantive help to the caller 12, but instead hopefully can only hope to be able to connect the caller 12 elsewhere immediately.

As may be appreciated, such a dire level of seriousness of the communication from the caller 12 varies according to the type of professional 14 called thereby, although it may be fair to say that such dire level of seriousness usually involves matters of life and death. Thus, and as was alluded to above, if the professional 14 is a doctor, the dire level of seriousness may for example arise from a seriously ill patient. Likewise, if the professional 14 is a lawyer, the dire level of seriousness may for example involve a death row inmate client about to be executed.

In the context of an answering service 10 for a funeral professional 14, death may become routine to an agent 16, so a communication from a caller 12 must rise beyond such a matter in order to be considered dire by the agent 16. In one scenario of particular relevance, such direness is achieved when a caller 12 announces to the agent 16 that such caller 12 is going to commit suicide. Such scenario does not occur often, although it does occur enough to be appreciable. In particular, in such a suicide scenario, it may be that a caller 12 for whatever reason has decided to take his or her own life, by whatever means available, but at least has the presence of mind to arrange for a funeral director to attend to his or her body after the suicide has taken place, presumptively so that the funeral director can attend to the body without burdening the loved ones of the caller 12, and the like.

As may be understood, an agent 16 at the answering service 10 would not normally be expected to handle such a suicide scenario, at least in a professional manner, and likely is not trained to do so. More generally, the agent 16 is not normally expected to professionally handle any other situation having a correspondingly dire level of seriousness, where doing so requires capabilities that the agent 16 is not expected to possess. Instead, an appropriate response for the agent 16 and the answering service 10 would be to immediately place the caller 12 in contact with a trained professional that can in fact handle the situation, which in the case of the suicide scenario would be a suicide prevention service such as a suicide crisis center operating a suicide hotline, or the like.

Responding to Dire Communication at Answering Service

Figure 3:
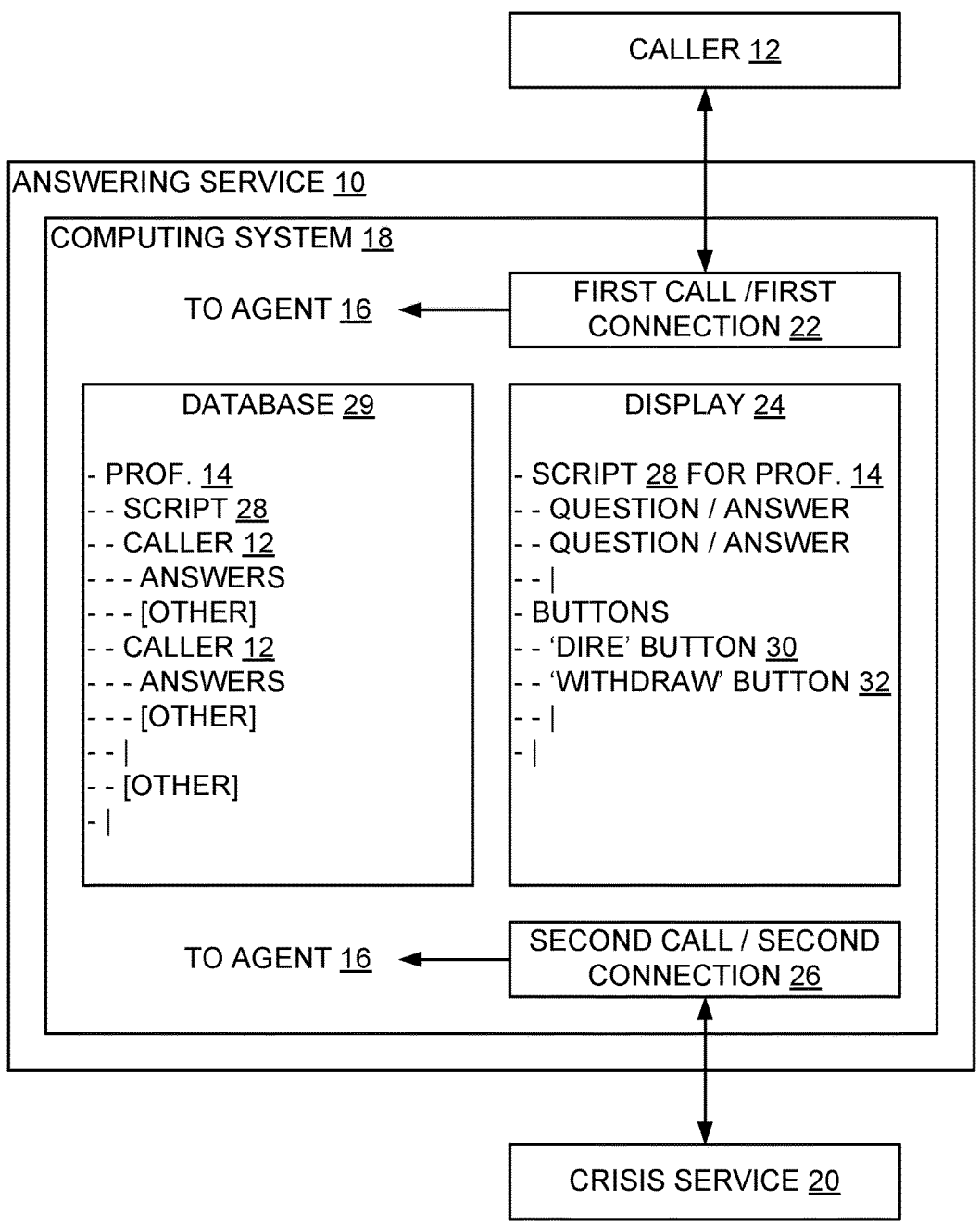
FIG. 3 is a block diagram of a computing system employed to answer a call from the client of FIG. 2 to the funeral professional of FIG. 2 as forwarded to the answering service of FIG. 2 in accordance with various embodiments of the present innovation.

In various embodiments of the present innovation, and turning now to FIG. 3, it is presumed that a call from a caller 12 to a funeral professional 14 as forwarded to an answering service 10 is answered by an individual agent 16 associated with the answering service 10 with the use of a computing system 18 instantiated by or on behalf of the answering service 10. Notably, such a computing system 18 as instantiated includes a mechanism for initiating contact with a crisis service 20 as soon as the agent 16 who is answering the call determines that the caller 12 expresses a form of dire communication that the agent 16 cannot handle and that the crisis service 20 can handle.

As seen in FIG. 3, the computing system 18 is in the nature of the computing device 100 on the top part of FIG. 1. Here, it is to be appreciated that the computing system 18 may among other things include a first connection 22 or the like for receiving the forwarded call from the caller 12, be it a voice call, a data call, a data message, a data conversation, or otherwise; a display 24 or the like upon which is shown various items; and a second connection 26 or the like for outgoing calls, again be they voice calls, data calls, data messages, data conversations, or otherwise. As may be appreciated, the connections 22, 26 may be in the nature of voice and/or data and/or video connections as may be appropriate. Thus, in the present innovation, a call may encompass most any form of communication capable between two parties, be it voice- and/or data- and/or video-based or otherwise, including but not limited to electronic mail, a chat conversation, push messaging, text messaging, video chatting, etc.

Figure 4:
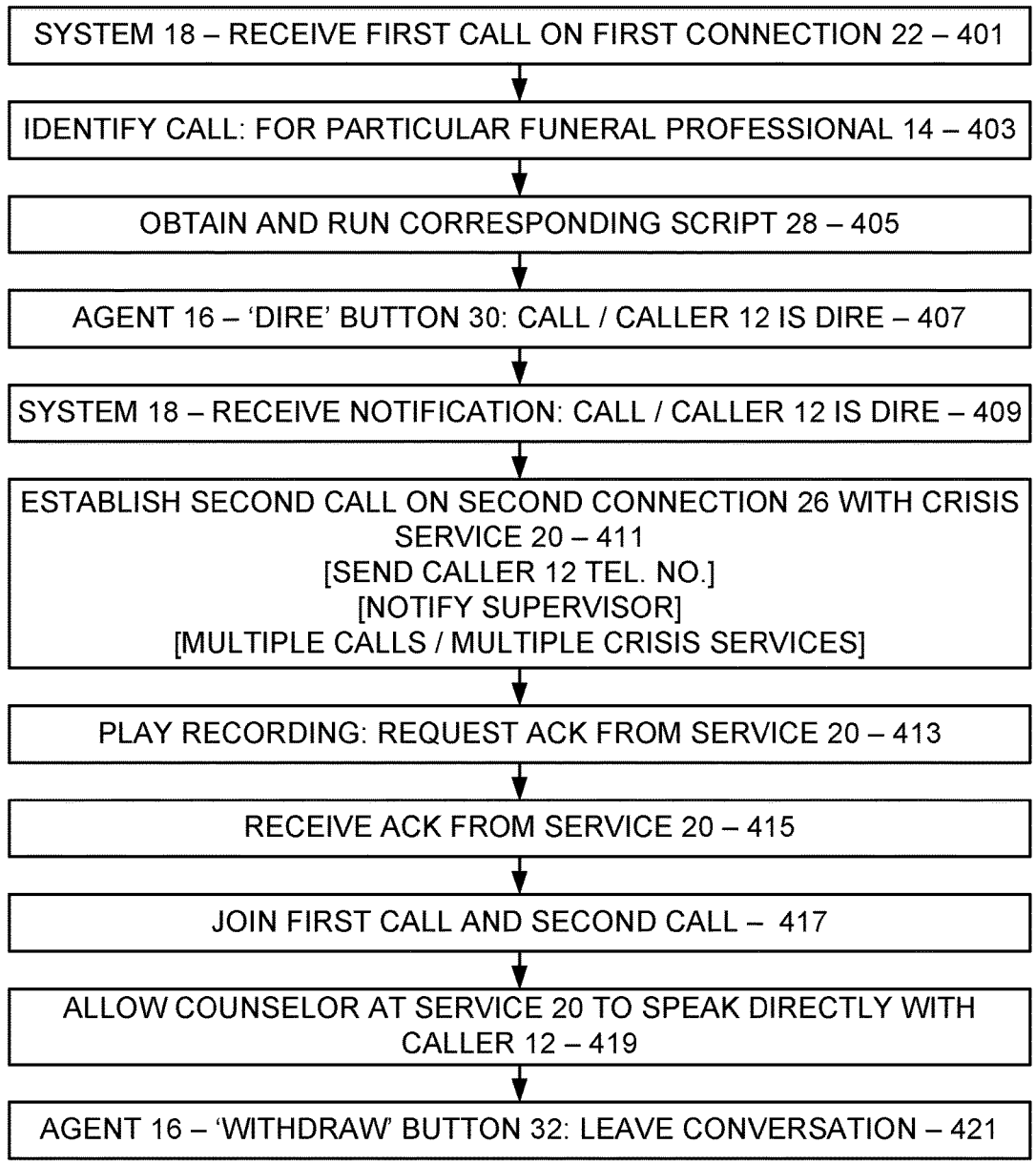
FIG. 4 is a flow diagram showing actions performed by the computing system of FIG. 3 in accordance with various embodiments of the present innovation.

As may be appreciated, the agent 16 at the computing system 18 of the answering service 10 may answer a particular forwarded call from a caller 12 on behalf of a particular funeral professional 14 according to a predetermined procedure or 'script' 28 that has been established for the particular funeral professional 14. Accordingly, and now referring also to FIG. 4, as an initial matter the particular call is received on the first connection 22 of the computing system 18 (401, FIG. 4), is identified by the system 18 as being for a particular funeral professional 14 (403), and based thereon the system 18 obtains and runs the corresponding script 28 (405), perhaps from a local or remote database 29 (FIG. 3). As may be appreciated, the system 18 may identify the particular funeral professional 14 for the forwarded call as at 403 in any appropriate manner, such as for example based on a caller ID, DNIS (Dialed Number Identification System), or other information associated with the forwarded call. Such identifying is known or should be apparent to the relevant public and therefore need not be set forth herein in any detail other than that which is provided.

As may be appreciated, the obtained and run script 28 as at 405 is in an electronic form, and may have any appropriate structure. Typically, although not necessarily, the script 28 includes a number of questions that are displayed on the display 24 of the computing system 18, the agent asks the questions to the caller 12 and enters corresponding answers into appropriate pre-defined spaces in the display 24, and the entered answers can be stored in a record of appropriate form in the database 29 or elsewhere. As should be understood, the questions and answers relate to ferreting out the purpose of the call from the caller 12, and also to collecting necessary information that should be forwarded from the answering service 10 to the funeral professional 14 at an appropriate time.

In the course of what may be described as a typical conversation between the agent 16 and a caller 12, the level of seriousness of the caller 12 and the conversation as experienced by the agent 16 may vary widely, both overall and from moment to moment. For example, even though the caller 12 may be calling regarding a newly deceased person, the caller 12 may experience moods and emotions that range from deep somberness all the way to lightheartedness or even relief, as is the complex nature of the reaction to death. That said, the level of seriousness is normally at least somewhat tempered by the fact that the death that is the basis of the conversation relates to someone else, both with respect to the caller 12 and the agent 16. However, and importantly, once the basis of the conversation becomes about the imminent death of the caller 12, as is the case with a caller 12 who is suicidal, the level of seriousness becomes extraordinarily high if not dire, particularly as experienced by the agent 16. Such dire level of seriousness may not necessarily be quantifiable, but an agent 16 can be expected to instantly and unmistakably know it when he or she experiences it, at least empirically.

Normally, the agent 16 based on the script 28 for the particular funeral professional 14 would collect information pertaining to the caller 12 and the reason for calling the funeral professional 14, and generally would act at some point to contact the funeral professional 14 with at least a portion of the collected information. However, in the event that the agent 16 determines from the caller 12 that the level of seriousness of the caller 12 and the conversation has become dire (407), the script 28 in all likelihood becomes unimportant, and the agent 16 instead may immediately notify the system 18 of the dire nature of the caller 12 and the call (409), in various embodiments of the present innovation.

As may be appreciated the agent 16 may determine that the level of seriousness has become dire as at 407 in any appropriate manner without departing from the spirit and scope of the present innovation. At its core, such a determination is a judgment call by the agent 16, and therefore is likely subjective in nature. Accordingly, in training the agent 16, the service 10 may for example discuss how to make such a determination, including warning signs and other indicia to look out for. While such determination could be made to be objective, perhaps by way of the agent 16 listening for the use of certain words by the caller 12, it should be the case that the objective determination is flexible enough to encompass most if not all levels of seriousness that are indeed dire.

Presumptively, the reason that the level of seriousness has become dire, at least with regard to the present innovation, is that the caller 12 is indeed indicating that he or she is suicidal and is imminent danger of taking his or her own life. That said, the reason for the dire level of seriousness may be most any reason without departing from the spirit and scope of the present innovation. As should be understood, the action taken based on the dire level of seriousness may be most any appropriate action, but in the case of a suicidal caller 12 in particular, the action taken may be expected to be a call from the service 10 to a suicide prevention service 20, such as a suicide hotline or the like, as will be set forth in more detail below.

In the present innovation, the agent 16 immediately notifies the system 18 of the dire nature of the caller 12 and the call as at 409 by way of actuating a button 30 or the like. As may be appreciated, the 'dire' button 30 may be a virtual button shown on the display 24, which may be labeled 'Suicidal' or the like. In such case, the button 30 is actuated by the agent by way of a displayed cursor and associated mouse, by way of touching if the display 24 is a touch display, by way of a keystroke or keystroke sequence on an associated keyboard of the computing system 18, or the like. Alternately, the button 30 may be a virtual or actual device separate from the display 24, and in particular may be hardware on an associated keyboard of the computing system 18 or some other related structure, and/or software actuated by such hardware. Importantly, and as will be set forth in more detail below, by actuating the button 30, the computing system 18 in various embodiments of the present innovation automatically begins to contact the service 20 in an appropriate manner.

In particular, and in various embodiments of the present innovation, upon determining that the agent 16 has actuated the 'dire' button 30 as at 409, the system 18 establishes a second call, perhaps by way of the second connection 26 of the computing system 18, between the agent 16 and such a crisis service 20 (411). Establishing such a second call may be performed in any appropriate manner, and with any appropriate service 20, without departing from the spirit and scope of the present innovation. Presumptively, the system 18 has the telephone number or the like for the service 20, and such service 20 is staffed with appropriate crisis counselors or the like who are able to answer the second call and provide assistance. That said, the level of sophistication of the service 20 and the equipment and staffing thereof may vary widely, and accordingly it cannot be presumed that the service 20 will answer immediately, or that a crisis counselor thereat may be immediately available. Also, it can be presumed that the agent 16 is busy trying to deal with the caller 12. Accordingly, in various embodiments of the present innovation, the system 16 does not connect the agent 16 into the second call until such a crisis counselor is available, as will be set forth in more detail below.

In particular, to establish that such a crisis counselor is available, and in various embodiments of the present innovation, upon an answer to the second call from the crisis service 20, the system 18 plays a recording on the second call to request a prompt from the service 20 from such a crisis counselor or the like (413). In various embodiments of the present innovation, the recording is something on the order of "We are [an answering service] experiencing a call from a [suicidal] caller and are requesting immediate assistance. Please acknowledge that such immediate assistance is available by pressing 1", in which case the system 18 would then wait until a crisis counselor or some other appropriate person at the service 20 has indeed pressed 1 on a touchtone telephone keypad or the like to acknowledge availability (415). Of course, the message may be any appropriate message, and the method and mechanism to acknowledge availability at the service 20 may be any appropriate method and mechanism, without departing from the spirit and scope of the present innovation.

While it is hoped that the acknowledgment of availability as at 415 may be received by the system 18 promptly, it is also to be understood that such acknowledgment may be delayed for any of a number of reasons. For example, it may be that the service 20 is understaffed and therefore busy, or may even be closed, in which case the answered second call may be in an automated form on the part of the service 20. In any event, and presuming that the acknowledgment may be delayed, the recording played on the second call as at 413 is repeated on a regular basis, in various embodiments of the present innovation. Thus, it may for example be that the recording is repeated continuously, or once every five seconds, or the like. Also, presuming that the acknowledgment may not be received at all, or at least within a reasonable amount of time, it may be that the recording is played a set number of times, or is repeated for a set duration, after which the system 18 ends the second call. Thus, it may for example be that the recording is played a maximum of ten times, or is repeated for five minutes.

Presuming that the acknowledgment is indeed received as at 415 and there is indeed a crisis counselor or the like at the service 20 available to speak with the agent 16 and the caller 12, the second call between the system 18 and the counselor at the service 20 is immediately joined with the first call between the caller 12 and the agent 16 (417), and the counselor at the service 20 is immediately able to speak directly with the caller 12 by way of such joined call (419), in various embodiments of the present innovation. Joining the calls is generally known, and may be performed in any appropriate manner without departing from the spirit and scope of the present innovation. Hopefully, with the advice and guidance of the counselor at the service 20, the caller 12 can be convinced to avoid any activity that would be harmful thereto, and to seek appropriate help from an appropriate source.

Notably, once the caller 12 and the counselor at the service 20 are speaking directly with one another, the agent 16 may withdraw from the conversation, and from the dire level of seriousness thereof (421). Accordingly, and in various embodiments of the present innovation, the agent 16 so withdraws 09 by way of actuating another button 32 or the like. As may be appreciated, and similar to the button 32, the 'withdraw' button 32 may be a virtual button shown on the display 24, which may be labeled 'Leave' or the like. In such case, the button 32 is actuated by the agent by way of a displayed cursor and associated mouse, by way of touching if the display 24 is a touch display, by way of a keystroke or keystroke sequence on an associated keyboard of the computing system 18, or the like. Alternately, the button 32 may be a virtual or actual device separate from the display 24, and in particular may be hardware on an associated keyboard of the computing system 18 or some other related structure, and/or software actuated by such hardware.

Further Concepts

As may be appreciated by the relevant public, the crisis service 20 oftentimes employs its own computing system to receive calls, and in the course of doing so the computing system of the service 20 may collect information relating to each call thereto, including among other things the telephone number of the caller for each call. With such telephone number, and as may be appreciated, the service 20 can call back the caller should a disconnection occur, among other things. Collecting the telephone number of the caller may be performed in any appropriate manner, but typically may be done based on a caller ID service or a DNIS (Dialed Number Identification System) lookup, as was alluded to above.

In various embodiment of the present innovation, in the course the system 18 establishing the second call with the service 20 as at 411, the system 18 sends the telephone number of the caller 12 to the service 20 to be perceived by a caller ID service thereof, for example. Accordingly, the service 20 can call back the caller 12 directly at the telephone number thereof should a disconnection occur, among other things. As may be appreciated, the system 18 may send the telephone number of the caller 12 to the service 20 to be perceived thereby in any appropriate manner without departing from the spirit and scope of the present innovation.

As was pointed out above, when an agent 16 answers an especially dire call from a caller 12 threatening suicide, the level of stress experienced by the agent can be extreme. Accordingly, it may advisable that a supervisor or the like be made aware of the dire call, if only that the supervisor can check in with the agent and debrief same. Depending on the circumstances, the agent 16 may need to be relieved for a break, to take the rest of the day off, or even more.

In various embodiments of the present innovation, then, in the course of the system 18 determining that the agent 16 has actuated the button 30 as at 409 and establishing the second call as at 411, the system 18 also notifies a supervisor of the agent 16 regarding the dire call. Note that such notification may be immediate, so that the supervisor can quickly join with the agent 16 and perhaps help out in an appropriate manner during the dire call, or may be delayed, so that the supervisor can meet with the agent 16 at a later time to discuss the dire call and how the agent is dealing with the stress of the dire call. Notifying the supervisor may be performed in any appropriate manner without departing from the spirit and scope of the present innovation. For example, such notification may be by way of a text message, an electronic mail, or a direct notification at a display 24 of the supervisor, among other things.

As was set forth above, a crisis service 20 can be expected to be staffed with appropriate crisis counselors or the like who are able to answer the second call and provide assistance. However, it cannot be presumed that the service 20 will answer immediately, or that a crisis counselor thereat may be immediately available. Accordingly, the system 16 does not connect the agent 16 on the first call with the caller 12 into the second call with the service 20 until such a crisis counselor is available. As a result, the agent 16 and the caller 12 may have to wait a substantial and perhaps even unreasonable amount of time for such crisis counselor.

In various embodiments of the present innovation, then, rather than establishing a single second call to a single crisis service 20 in the manner set forth above as at 411 et seq., the system 18 simultaneously establishes a plurality of second calls to a plurality of crisis services 20, and waits until a crisis counselor at one of the plurality of crisis services 20 is available. In particular, to establish that such a crisis counselor is available from one of the plurality of services, and in various embodiments of the present innovation, upon an answer to each second call from each service 20, the system 18 plays a recording on each answered second call to request a prompt from the corresponding service 20 from such a crisis counselor or the like, as at 413. As before, each played recording is something on the order of "We are [an answering service] experiencing a call from a [suicidal] caller and are requesting immediate assistance. Please acknowledge that such immediate assistance is available by pressing 1". Also as before, each played recording may be replayed multiple times.

However, in the case of multiple called crisis services 20, the system 18 would then wait until a crisis counselor or some other appropriate person at one of the called services 20 has indeed pressed 1 on a telephone keypad or the like to acknowledge availability, as at 415. Once such a counselor from one of the called services is indeed available, the system 18 would again immediately join the second call between the system 18 and the available counselor at the service 20 with the first call between the caller 12 and the agent 16, as at 417, and the available counselor at the service 20 is immediately able to speak directly with the caller 12 by way of such joined call as at 419. In addition, the system 18 would then end all other second calls to all other crisis services 20, perhaps with an appropriate recorded message that the caller 12 is being helped by another counselor from another service 20.

As thus far set forth, the present innovation is employed in the context of an agent 16 at an answering service 10 answering a call from a dire caller 12 on behalf of a professional 14 such as a funeral professional 14 or the like, and then connecting the dire caller 12 with an appropriate counselor at an appropriate service 20. Note, however, that such a dire caller 12 may also be experienced directly by the funeral professional 14. In particular, the professional 14 may answer a call and find himself or herself having to deal with a suicidal caller 12, among other things.

In various embodiments of the present innovation, then, the answering service 10 may offer as an additional service to the professional 14 the ability to have a similar 'dire' button 30 by which the professional can commence a second call to a crisis service 20, in a manner similar to that which is set forth above. Although the actions taken here would be expected to be similar to those set forth above in connection with 409, et seq., in a manner that should now be apparent, it does bear mentioning that it may be necessary for the system 18 to be available to the professional 14 to establish the second call, to play various recordings, and to take such other actions as may be necessary to procure the counselor on the second call. Such availability may be achieved by way of providing an application to the professional 14, perhaps on a mobile device thereof or the like, in a manner which should be apparent to the relevant public. Note too that if the professional 14 is attempting to deal with such dire caller 12 by way of such mobile device, it may be difficult for such professional 14 to both talk with such dire caller 12 on such mobile device and also actuate such dire button 30 on the same mobile device. In such a case, and in various embodiments of the present innovation, the dire button 30 is located away from the mobile device but is communicatively coupled thereto. For example, the dire button 30 may be instantiated on a screen of an auxiliary device such as a 'smart' wristwatch or the like auxiliary to the mobile device but in communication therewith, so that a press of the dire button 30 on the auxiliary device is immediately communicated to the mobile device and beyond.

CONCLUSION

The programming believed necessary to effectuate the processes performed by the computing system 18 in connection with the various embodiments of the present innovation is relatively straight-forward and should be apparent to the relevant programming public based on the present disclosure. Accordingly, such programming is not attached hereto. Any particular programming, then, may be employed to effectuate the various embodiments of the present innovation without departing from the spirit and scope thereof.

In the present innovation, a system and method are set forth for responding to a dire communication at an answering service 10 or the like. When an agent 16 at the answering service 10 answers a call from a caller 12 and determines that the call is of an especially high level of seriousness, the agent 16 can immediately trigger a communications protocol to place the caller 12 in direct communication with a crisis service 20 that can better assist the caller 12 in view of the especially high level of seriousness. Upon establishing such direct communication between the caller 12 and the crisis service 20, the agent 16 at the answering service 10 can withdraw from the call and detach from the stress associated therewith.

It should be appreciated that changes could be made to the embodiments described above without departing from the innovative concepts thereof. For example, although the present innovation is set forth primarily in terms of a funeral business or the like, such innovation may also be practiced by any other appropriate type of business or called party that employs an answering service for callers 12 or other parties. Likewise, although the present innovation is set forth primarily in terms of an answering service or the like, such innovation may also be practiced by any other appropriate type of business or service, whether acting in an intermediary capacity or otherwise. Moreover, although the present innovation is set forth primarily in terms of telephonic calls or the like from initial callers and/or chats initiated by callers 12, such innovation may also be practiced in connection with any other appropriate type of communications medium and other types of interested parties, perhaps with suitable modification. Likewise, although the present innovation is set forth with reference to the use of a script 28, such script 28 need not necessarily be employed, in which case the call may be answered in a free-form manner, with suitable modification. Significantly, although the present innovation is disclosed primarily within the framework of a dire caller 12 who is suicidal, the dire caller 12 may instead be any other type of caller 12 expressing a high level of stress or seriousness, where immediate communication is required. It should be understood, therefore, that this innovation is not limited to the particular embodiments disclosed, but it is intended to cover modifications within the spirit and scope of the present innovation as defined by the appended claims.

The invention claimed is:

1. A method performed by an answering service on behalf of a called party when a caller places a first call to the called party and the called party is unable or unwilling to answer the first call directly, the first call being forwarded to the answering service and answered by an agent of the answering service, the method being performed by a computing system of the answering service, the computing system including a processor, a memory, an inputting device, and a display, the method comprising the processor of the computing system:
  receiving a notification from the agent that a level of seriousness of the caller and conversation between the caller and the agent has become dire;
  establishing a second call between the agent and a crisis service, the crisis service presumptively being staffed with a crisis counselor able to answer the second call and provide assistance to the caller;
  establishing that the crisis counselor at the crisis service is available, by:
  determining that the second call to the crisis service has been answered;
  playing a recording on the second call to request an acknowledgment of the availability of the crisis counselor at the crisis service; and
  receiving the requested acknowledgment;
  connecting the agent into the second call only when the crisis counselor has acknowledged being available;
  joining the second call between the connected agent and the crisis counselor at the crisis service with the first call between the caller and the connected agent; and
  allowing the crisis counselor at the crisis service and the caller to speak directly by way of the joined calls,
  wherein the crisis counselor at the crisis service can address the caller and attempt to convince same to avoid any activity that would be harmful thereto.

2. The method of claim 1 wherein the called party is a funeral professional and the caller calls the funeral professional regarding the imminent death of the caller by suicide, and wherein the crisis service is a suicide crisis service.

3. The method of claim 1 wherein the agent determines that the level of seriousness of the caller and conversation between the caller and the agent has become dire because the caller is suicidal.

4. The method of claim 1 wherein the received notification is an actuation of a 'dire' button by the agent, the 'dire' button being one of a virtual button on a display of the agent and an actual button available to the agent.

5. The method of claim 1 wherein establishing that the crisis counselor at the crisis service is available comprises:
  determining that the second call to the crisis service has been answered;
  playing a recording on the second call to request an acknowledgment of the availability of the crisis counselor at the crisis service, the requested acknowledgment being a predetermined touchtone;
  receiving the predetermined touchtone.

6. The method of claim 1 wherein establishing that the crisis counselor at the crisis service is available comprises:
  determining that the second call to the crisis service has been answered;
  playing a recording on the second call to request an acknowledgment of the availability of the crisis counselor at the crisis service, the played recording being repeated one of a number of times and for a predetermined duration; and
  receiving the requested acknowledgment.

7. The method of claim 1 wherein, upon allowing the crisis counselor at the crisis service and the caller to speak directly by way of the joined calls, the method further comprises receiving a notification from the agent that the agent wishes to withdraw from the joined call, and based thereon removing the agent from the joined call.

8. The method of claim 1 wherein, upon allowing the crisis counselor at the crisis service and the caller to speak directly by way of the joined calls, the method further comprises receiving a notification from the agent that the agent wishes to withdraw from the joined call, and based thereon removing the agent from the joined call, the received notification being an actuation of a 'withdraw' button by the agent, the 'withdraw' button being one of a virtual button on a display of the agent and an actual button available to the agent.

9. The method of claim 1 wherein establishing the second call between the agent and the crisis service includes sending a telephone number of the caller to the crisis service to be perceived by a caller ID service thereof, whereby the crisis service can call back the caller directly at the telephone number thereof should a disconnection occur.

10. The method of claim 1 further comprising, upon receiving the notification from the agent that the level of seriousness of the caller and conversation between the caller and the agent has become dire, immediately notifying a supervisor of the agent regarding the dire first call, whereby the supervisor can quickly join with the agent and perhaps help with the dire first call.

11. The method of claim 1 further comprising, upon receiving the notification from the agent that the level of seriousness of the caller and conversation between the caller and the agent has become dire, notifying a supervisor of the agent regarding the dire first call, whereby the supervisor can meet with the agent to discuss the dire first call.

12. The method of claim 1 comprising:
  simultaneously establishing a plurality of second calls, each of the plurality of second calls being between the agent and one of a plurality of crisis services, each crisis service presumptively being staffed with a crisis counselor able to answer the second call and provide assistance to the caller;
  connecting the agent into an acknowledging one of the plurality of second calls only when the crisis counselor at the acknowledging one of the plurality of second calls has acknowledged being available; and joining the acknowledging one of the plurality of second calls between the connected agent and the available crisis counselor with the first call between the caller and the connected agent.

13. The method of claim 1 comprising:

simultaneously establishing a plurality of second calls, each of the plurality of second calls being between the agent and one of a plurality of crisis services, each crisis service presumptively being staffed with a crisis counselor able to answer the second call and provide assistance to the caller;

determining which of the plurality of second calls firstly acknowledges that the crisis counselor of the crisis service thereof is available;

connecting the agent into the firstly acknowledging one of the plurality of second calls;

joining the firstly acknowledging one of the plurality of second calls between the connected agent and the available crisis counselor with the first call between the caller and the connected agent; and ending all of the plurality of second calls other than the firstly acknowledging one.

14. The method of claim 1 comprising:

simultaneously establishing a plurality of second calls, each of the plurality of second calls being between the agent and one of a plurality of crisis services, each crisis service presumptively being staffed with a crisis counselor able to answer the second call and provide assistance to the caller;

determining which of the plurality of second calls firstly acknowledges that the crisis counselor of the crisis service thereof is available;

connecting the agent into the firstly acknowledging one of the plurality of second calls;

joining the firstly acknowledging one of the plurality of second calls between the connected agent and the available crisis counselor with the first call between the caller and the connected agent; and ending all of the plurality of second calls other than the firstly acknowledging one, after playing a recorded message that the caller is being helped by another crisis counselor from another crisis service.

15. A method performed by a service on behalf of a called party when a caller places a first call to the called party, the method being performed by a computing system of the service, the computing system including a processor, a memory, an inputting device, and a display, the method comprising the processor of the computing system:

receiving a notification from the called party that a level of seriousness of the caller and conversation between the caller and the called party has become dire;

establishing a second call between the called party and a crisis service, the crisis service presumptively being staffed with a crisis counselor able to answer the second call and provide assistance to the caller;

establishing that the crisis counselor at the crisis service is available, by:

determining that the second call to the crisis service has been answered;

playing a recording on the second call to request an acknowledgment of the availability of the crisis counselor at the crisis service; and receiving the requested acknowledgment;

connecting the called party into the second call only when the crisis counselor has acknowledged being available;

joining the second call between the connected called party and the crisis counselor at the crisis service with the first call between the caller and the connected called party; and allowing the crisis counselor at the crisis service and the caller to speak directly by way of the joined calls, wherein the crisis counselor at the crisis service can address the caller and attempt to convince same to avoid any activity that would be harmful thereto.

16. The method of claim 15 wherein the called party is a funeral professional and the caller calls the funeral professional regarding the imminent death of the caller by suicide, and wherein the crisis service is a suicide crisis service.

17. The method of claim 15 further comprising providing the called party with an application on a mobile device thereof, the received notification being an actuation of a 'dire' button of the application by the called party on a display of the mobile device.

18. The method of claim 15 further comprising providing the called party with an application on a mobile device thereof, the received notification being an actuation of a 'dire' button of the application by the called party on a display of smart wristwatch in communication with the mobile device.

19. A method performed by a call service when a caller places a first call answered by an agent of the call service, the method being performed by a computing system of the call service, the computing system including a processor, a memory, an inputting device, and a display, the method comprising the processor of the computing system:

receiving a notification from the agent that a level of seriousness of the caller and conversation between the caller and the agent has become dire;

establishing a second call between the agent and a crisis service, the crisis service presumptively being staffed with a crisis counselor able to answer the second call and provide assistance to the caller;

establishing that the crisis counselor at the crisis service is available, by:

determining that the second call to the crisis service has been answered;

playing a recording on the second call to request an acknowledgment of the availability of the crisis counselor at the crisis service; and receiving the requested acknowledgment;

connecting the agent into the second call only when the crisis counselor has acknowledged being available;

joining the second call between the connected agent and the crisis counselor at the crisis service with the first call between the caller and the connected agent; and allowing the crisis counselor at the crisis service and the caller to speak directly by way of the joined calls, wherein the crisis counselor at the crisis service can address the caller and attempt to convince same to avoid any activity that would be harmful thereto.

* * * * *